United States Patent
Richard

[15] 3,696,789
[45] Oct. 10, 1972

[54] AQUARIUM WITH IMPROVED OPTICAL QUALITIES

[72] Inventor: Eugene D. Richard, 3664 Greinwich Boulevard, Lake Charles, La. 70601

[22] Filed: Feb. 26, 1971

[21] Appl. No.: 119,267

[52] U.S. Cl. .................................. 119/5, 240/2 LC
[51] Int. Cl. ........................................... A01k 64/00
[58] Field of Search .......... 119/5; 40/130 K; 35/19 B; 240/2 LC

[56] References Cited

UNITED STATES PATENTS

| | | | |
|---|---|---|---|
| 1,803,571 | 5/1931 | Ulman | 240/2 LC |
| 1,860,698 | 5/1932 | Venditti | 119/5 |
| 1,908,939 | 5/1933 | Venditti | 119/5 |
| 2,016,123 | 10/1935 | Schorr | 119/5 |
| 2,293,612 | 8/1942 | Montague | 119/5 X |

Primary Examiner—Hugh R. Chamblee
Attorney—Berman, Davidson & Berman

[57] ABSTRACT

An aquarium of transparent material and of prismatic shape, provided with a vertical elongated lamp or lamps adjacent a rear corner, with an opaque shield between the lamps and the corner. Light rays from the lamps enter the aquarium through its walls and are refracted and dispersed, leaving the front wall in dispersed spectral form, thereby providing unusual prismatic rainbow effects. Because of the angular relationship between the walls, internal reflection effects are also provided, multiplying the images of the objects in the aquarium.

11 Claims, 13 Drawing Figures

PATENTED OCT 10 1972 3,696,789

INVENTOR.
EUGENE D. RICHARD,
BY
Berman, Davidson & Berman,
ATTORNEYS

PATENTED OCT 10 1972 3,696,789
SHEET 2 OF 2
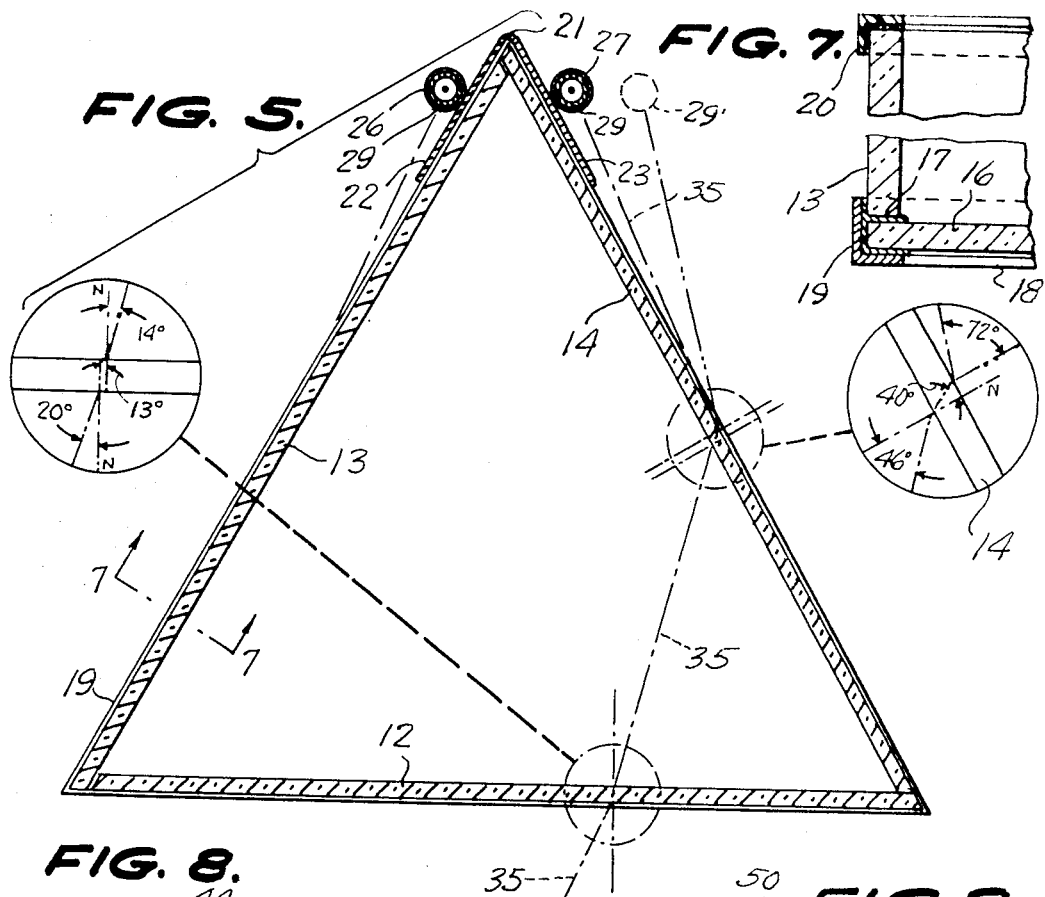
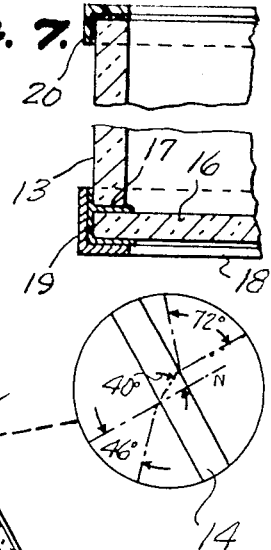
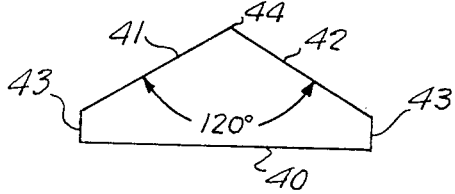
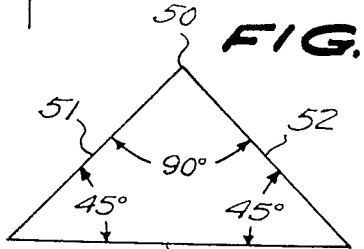
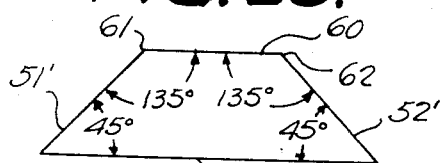
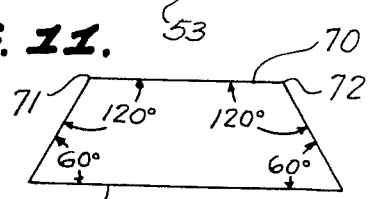
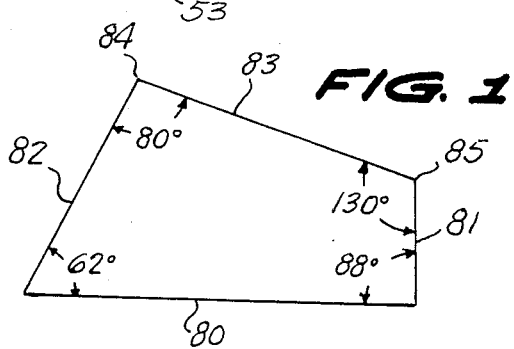
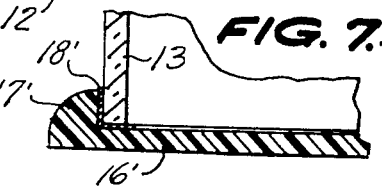
EUGENE D. RICHARD,
Berman, Davidson & Berman,

AQUARIUM WITH IMPROVED OPTICAL QUALITIES

This invention relates to improvements in fish tanks, and more particularly to an illuminated aquarium providing unusual optical effects.

A main object of the invention is to provide a novel and improved illuminated aquarium which is relatively simple in construction, which is attractive in appearance, and which employs inexpensive components to provide highly interesting and decorative optical effects.

A further object of the invention is to provide an improved illuminated fish tank which employs the principles of refraction and dispersion to provide prismatic rainbow effects and which further employs the principles of internal reflection to provide multiple images of its contents, the fish tank being relatively inexpensive to fabricate, being attractive in appearance, and illuminating the contents thereof in an interesting and entertaining manner, whereby to greatly enhance the appearance of the fish tank itself and of the objects contained therein.

A still further object of the invention is to provide an improved prismatic illuminated aquarium which may be employed to demonstrate various optical principles, such as the principles of refraction, dispersion, internal reflection, and the like, and which thus serves as an educational device as well as a decorative container for tropical fish and similar objects employed in aquariums.

Further objects and advantages of the invention will become apparent from the following description and claims, and from the accompanying drawings, wherein:

FIG. 5 is an enlarged horizontal cross-sectional view taken substantially on the line 5—5 of FIG. 3 and including graphical sketches showing how the angles of refraction of light rays through the aquarium are computed.

FIG. 7 is an enlarged fragmentary vertical cross-sectional view taken substantially on the line 7—7 of FIG. 5.

FIG. 7A is a vertical cross-sectional view similar to the lower portion of FIG. 7, but showing a modification of the bottom structure of the aquarium.

FIGS. 8, 9, 10, 11 and 12 are diagrammatic top plan views showing various different prismatic shapes which may be employed in constructing an aquarium in accordance with the present invention.

Figure 1:
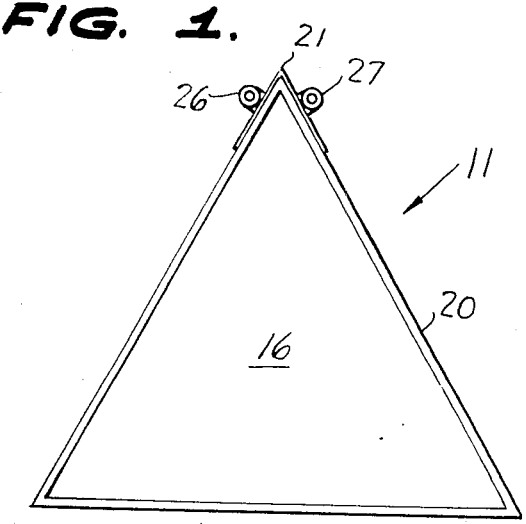
FIG. 1 is a top plan view of a typical prismatic illuminated aquarium constructed in accordance with the present invention.
Figure 2:
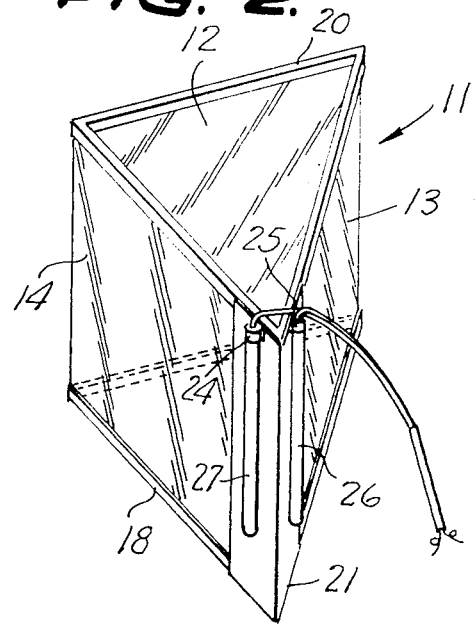
FIG. 2 is a rear perspective view of the prismatic illuminated aquarium of FIG. 1.
Figure 3:
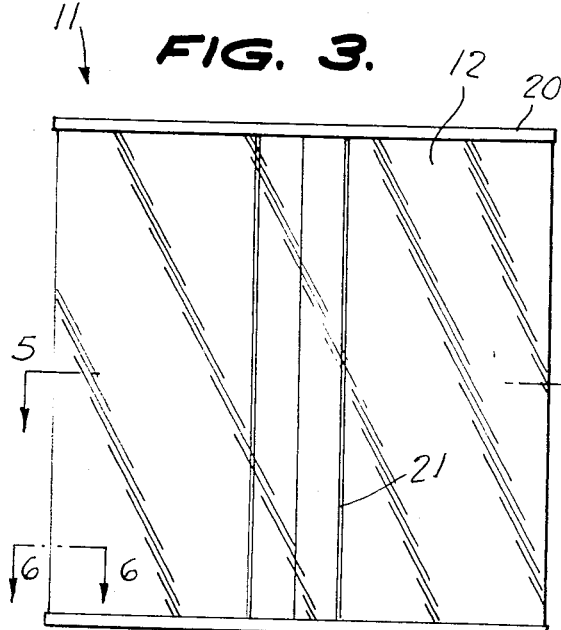
FIG. 3 is a front elevational view of the aquarium of FIGS. 1 and 2.
Figure 4:
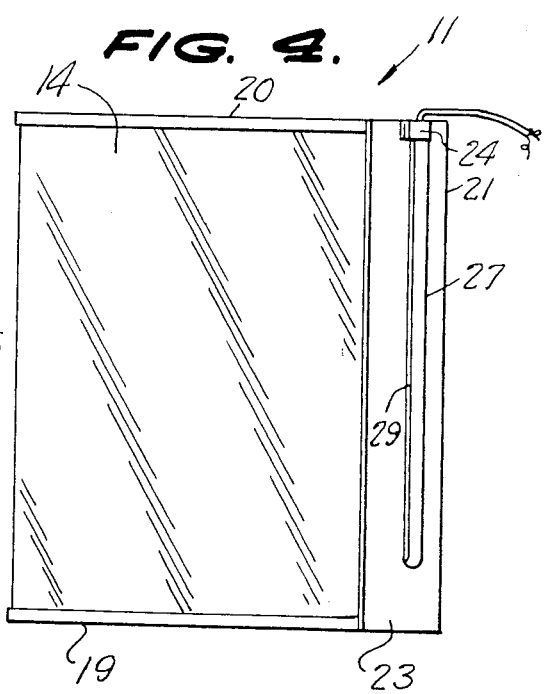
FIG. 4 is a side elevational view of the aquarium of FIGS. 1 and 2.
Figure 6:
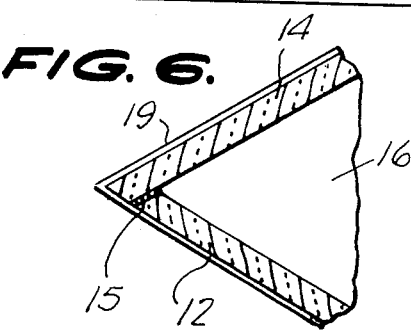
FIG. 6 is an enlarged fragmentary horizontal cross-sectional view taken substantially on the line 6—6 of FIG. 3.

Referring to the drawings, and more particularly to FIGS. 1 to 7, 11 generally designates a typical aquarium constructed in accordance with the present invention. In the typical embodiments illustrated in FIGS. 1 to 7, the aquarium is in the shape of a triangular prism, the horizontal cross section of which is generally that of an equilateral triangle. Thus, the aquarium tank 11 comprises a transparent front wall 12 and similar transparent rearwardly convergent side walls 13 and 14. The walls 12, 13 and 14 may be of any suitable transparent material, for example, transparent plastic material, glass, or the like. In the example illustrated in the drawings, said walls are of transparent glass material. The abutting vertical edge portions of the transparent panels may be suitably sealingly secured together, for example, by layers of glue 15, as shown in FIG. 6, whereby an abutting edge of one wall may be cemented to a marginal edge portion of an adjacent panel. The tank is provided with a glass bottom wall 16 and the bottom edges of the vertical walls of the tank are cemented by suitable glue to the margins of the triangular bottom wall 16, as shown at 17 in FIG. 7. The bottom peripheral edge portion of the tank is supportingly received in and cemented in a triangular frame 18 of angle iron, or other suitable rigid strong material. Thus, a further layer of glue 19 is provided between the bottom edge portion of the aquarium tank and the triangular supporting angle iron frame 18.

Cemented on the top edges of the vertical transparent panels 12, 13 and 14 is a peripheral top cover frame 20 of right angled shape, as shown in FIG. 7, made of any suitable material, such as plastic material. Thus, the cover frame 20 peripherally covers the top rim of the tank and has a depending peripheral flange as well as a horizontal flange which overlies the top edges of panels 12, 13 and 14.

FIG. 7A illustrates an alternative construction wherein the bottom of the tank comprises a triangular base plate member 16' having an integral upstanding marginal rib or flange 17', defining a triangular recess which receives the bottom edge portions of the vertical transparent panels 12, 13 and 14 and which is sealingly secured therein by a layer of suitable cement 18'. The integral bottom plate member 16' may be made of molded plastic material or any other suitable material having the necessary strength and water-tightness.

Secured in any suitable manner to the rear vertical corner of the aquarium tank is an opaque shield member 21 of any suitable opaque material, such as sheet metal, opaque sheet plastic material, cardboard, or the like. The shield member 21 is of generally V-shape and is forwardly divergent so as to conform with the rear apex corner of the tank. Thus, the shield member 21 is provided with the forwardly divergent side strips 22, 23 which are disposed over the rear marginal portions of the rearwardly convergent transparent side panels 13 and 14. Secured on the top portions of the opaque strips 22 and 23 are downwardly facing lamp sockets 24 and 25 in which are mounted depending elongated tubular lamp assemblies 26 and 27 which depend for the major portion of the height of the tank. As shown in FIG. 5, the lamp assemblies 26 and 27 are located well behind the front vertical edges of the opaque strips 22 and 23 so as to shield the rear portion of the tank from the entry of direct light rays from the lamp assemblies. Thus, the strips 22 and 23 are of sufficient width to prevent a direct view of the lamp assemblies 26 and 27 from the front of the tank.

It is preferable that the lamps included in the assemblies 26 and 27 be of a type defining a concentrated linear light source, such as a lamp having a vertical filament. However, lamps not meeting these requirements may be employed, in which case the assemblies 26 and 27 may include opaque coatings or lamp-receiving opaque housings formed with forwardly directed vertical slits 29, as shown in FIG. 5. The slits 29 assure that the light rays emerge in the form of a concentrated vertical beam, providing essentially the same effect as a linear source. The V-shaped shield member 21 serves to shield the light pressure sources from being directly viewed from the front of the tank and also act to prevent diffracted or scattered light from directly entering the rear apex portion of the tank.

The slits 29 are relatively narrow, so that the light beam from the filament of each lamp is essentially collimated, since the lamps employ relatively concentrated filaments. Thus, the lamp assembly 27 at the right side of the rear apex of the tank, as viewed in FIG. 5, is so located as to provide a beam 35 which is inclined at a relatively small angle to the transparent panel 14, and which thus impinges on said panel at a large angle of incidence, of the order of 72°, as shown in the diagram at the right side of FIG. 5. The beam 35 impinges on the intermediate portion of the panel 14 and is refracted thereby into the interior of the tank, for example, leaving the inside surface of panel 14 at an angle of refraction of the order of 46°. The beam 35 then travels to the front panel 12, and passes through the front panel, being diffracted thereby in the manner substantially illustrated in the diagram at the left side of FIG. 5. Thus, the beam 35 traveling through the liquid in the tank impinges on the transparent front panel 12 at an angle of incidence of the order of 14°, is transmitted through the panel and leaves the front surface of the panel at an angle of refraction of the order of 20°. Therefore, assuming the beam 35 to be monochromatic, the image of the slits 29, as viewed from the front of the tank, would appear to be displaced somewhat to the right, as shown at 29' in FIG. 5. However, if the lamp employed in the assembly 27 is polychromatic, for example, emits substantially white light, the beam 35 will be dispersed as it is refracted through the panels 14 and 12 and the intervening liquid, and will emerge in spectrally distributed form, so that when viewed from the front of the tank, the observer will see a spectrum of the various components of the light emitted through the slits 29. A similar spectrum would be observed at the left side of panel 12 due to the refraction and dispersion of the light beam from the slit 29 of the lamp assembly 26. Thus, a double spectrum will appear to the observer looking through the front panel of the tank. In other words, the observer will see a double rainbow in the tank as he looks through the front panel thereof. Furthermore, the objects in the tank will be illuminated by the refracted and dispersed light, so that such objects will appear with interesting and attractive coloration. The fish, such as tropical fish, or the like, contained in the tank will change color and will produce highly unusual visual effects as they swim through the water in the tank. Furthermore, because of the angular relationship between the side walls 12, 13 and 14, the objects in the tank will appear to be multiplied due to the effects of internal reflection. Thus, even if the tank contains merely a few fish and a few simple additional objects, the visual effect provided by the above-described structure would be equivalent to that obtained by a much larger tank containing many more fish and many more additional decorative objects. Furthermore, the interesting colorations and spectral effects obtained are not usually present in conventional tanks unless expensive filters or other special optical components are employed with the light sources used for illuminating the tank.

It will be noted that the lamp assemblies 26 and 27 in the above-described typical embodiment are not directly visible from the front of the tank, but are so arranged that they illuminate the tank with light refracted into the tank, and illuminate the objects contained in the tank by such refracted light, the objects being provided with colorations due to the dispersion of the light rays in the manner above described, and the coloration being in the form of vertical bands comprising the spectral components of the light generated by the lamps contained in the lamp assemblies 26 and 27.

As above mentioned, the slits 29 serve as a collimating means so as to control the direction of the light beams 35. If so desired, the coatings or housings may be omitted and lamps may be employed with relatively concentrated vertically extending filaments, which would provide a generally similar effect resembling that above described, but which would also produce considerable stray light at the rear portion of the tank which would illuminate the area adjacent the rear of the tank, and therefore not provide as much contrast in viewing the tank from the front as in the case above described where housings provided with vertical slits 29, cover the lamp bulbs. While the typical embodiment specifically described above employs a horizontal cross section in the form of an equilateral triangle for the tank, obviously, similar optical effects can be obtained by employing a cross section of any other triangular shape which contains at least one acute interior angle located at a forward portion or corner of the tank. FIGS. 8 to 11 diagramatically illustrate a number of different additionally possible cross-sectional configurations. For example, FIG. 8 shows a pentagonally shaped tank having a front wall 40 and forwardly convergent rear walls 41 and 42 intersecting at a rear corner angle of somewhat greater than 90°. Thus, walls 41 and 42 define acute angles with respect to the front wall 40 and thus it is possible to obtain refraction and dispersion effects similar to those obtained with the tank cross section employed in FIG. 5. In this instance, the lamp assemblies would be arranged adjacent the obtuse angle at the rear corner of the tank in the same manner as in FIG. 5. As shown in FIG. 8, the obtuse angle at the rear corner has an angular value of the order of 120°. The front corners of the tank are truncated by employing short transverse side walls 43 which are perpendicular to the front wall 40. Lamp assemblies 26 and 27 may be disposed symmetrically on opposite sides of the rear apex 44, employing a V-shaped opaque shielding strip 21 as in FIG. 5, to block direct view of the lamp assemblies from the front of the tank.

FIG. 9 illustrates another possible configuration which is in the shape of an isosceles right triangle wherein the rear corner is a right angle and the front corners each include 45°. Thus, lamp assemblies 26 and 27 may be mounted on opposite sides of the rear corner 50, symmetrically arranged relative thereto and a V-shaped opaque light shield 21 may be provided at the rear corner to prevent direct view of the lamp assemblies from the front of the tank. The light beams will be refracted through the rearwardly convergent walls 51 and 52 of the tank and refracted and dispersed beams will leave the tank through the front wall 53 thereof substantially in the same manner as described above in connection with FIG. 5.

FIG. 10 discloses another possible configuration which is generally similar to FIG. 9 except that the rear corner portion of the tank is truncated and a rear panel 60 is employed which is parallel to the front panel 53. The side walls 51' and 52' define obtuse rear corner angles with the rear wall 60. The tank thus has a trapezoidal cross-sectional shape. With this configuration vertical linear light sources, similar to the lamp assemblies 26 and 27 may be employed outwardly adjacent the respective rear corners 61 and 62, and suitable opaque shield means may be employed to prevent direct view of these light sources from the front of the tank. The opaque shield means may comprise either respective V-shaped strips mounted on the rear corners 61 and 62 or a single continuous opaque trough-shaped strip mounted on the rear portion of the tank and extending sufficiently forwardly along the walls 51' and 52' to prevent direct view of the light sources located outwardly adjacent the rear corners 61 and 62.

FIG. 11 shows another trapezoidal configuration similar to FIG. 10 except that it is in the form of a truncated equilateral triangle similar to that employed in FIG. 5, using a rear wall 70 which extends parallel to the front wall 12. This defines rear corner angles of 120° at respective rear corners 71 and 72, which correspond to the obtuse rear corners 61 and 62 of FIG. 10. The light sources may be arranged substantially in the same manner as described in connection with FIG. 10, namely, externally adjacent the obtuse rear corners 71 and 72, and suitable shield means may be employed to prevent direct view of the light sources from the front of the tank.

FIG. 12 illustrates another possible modification of the horizontal cross-section of the tank wherein the tank has the shape of an irregular quadrilateral in horizontal cross-section. Thus, the tank has a front wall 80, a right side wall 81 at an angle of approximately 88° to front wall 80, a left side wall 82 at an angle of approximately 62° to front wall 80, and a rear wall 83 making respective angles of 80° and 130° with side walls 82 and 81. As in the case of the shapes shown in FIGS. 8, 9, 10 and 11, suitable lamp assemblies may be provided, for example, at the rear corner 84, located at opposite sides of said corner adjacent the rearwardly convergent walls 82 and 83 and provided with suitable shield means preventing direct view of the light sources through the front wall 80. The shield means may comprise a V-shaped strip, similar to the strip 21 employed in the embodiment illustrated in FIG. 5, with opaque wings of sufficient width to block off direct view of the lamp assemblies from the front of the tank. If so desired, an additional light source may be provided adjacent the right margin of rear wall 83, namely, adjacent the other obtuse-angled rear corner 85, with the provision of suitable shield means to block off direct view from the front of the tank.

It will be noted that in each of the above-described embodiments of the invention, the well known properties of refraction and dispersion by transmission through prisms are utilized to produce the rainbow and other coloration effects in the tank and various additional interesting effects are provided by internal reflection taking place in the tank. Therefore, the tank may also be employed as an educational device to demonstrate the above-mentioned optical effects. For example, the tank may contain a plurality of liquids of different specific gravity which are allowed to settle in different layers, and the different refraction and dispersion effects produced by these different liquids may be studied. For example, the tank may contain a quantity of water and a quantity of a lighter liquid, such as kerosene, and the tank may be used to illustrate the difference in the index of refraction of these two liquids. The fact that the tank is indirectly illuminated, namely, that the light sources are shielded from direct view, greatly facilitates such demonstrations and other similar educational uses of the above-described illuminated prismatic tanks.

Although, as above pointed out, a monochromatic light source would be visible from the front of the tank at the position 29', shown in FIG. 5, in practice the light source is almost always polychromatic, for example, substantially similar to a white light source, and the viewer sees vertical spectral color bands representing the spectral components of the light from the source, due to the dispersion which takes place in the tank.

The tank could employ a single polychromatic light source instead of two light sources, or could employ special gaseous light sources wherein the light is derived from a particular gas such as hydrogen, helium, neon, or the like, to produce light of particular wavelengths or colors to enhance the optical qualities of the aquarium.

The illuminated aquarium with a light source or sources, as above described, is generally appropriate for its intended specific purpose, but other positions of the light source could be used to advantage for instructional purposes. For example, the angle of minimum deviation could be used, which would then require that the position of the source depend upon the refracting mediums. In such a case, the opaque shield would not be used.

While certain specific embodiments of an improved illuminated aquarium tank have been disclosed in the foregoing description, it will be understood that various modifications within the spirit of the invention may occur to those skilled in the art. Therefore, it is intended that no liminations be placed on the invention except as defined by the scope of the appended claims.

What is claimed is:

1. An illuminated aquarium tank comprising a transparent vessel of vertical prismatic shape having a rear vertical corner and a front main vertical wall, a substantially linear vertical light source mounted adjacent said rear vertical corner, and vertical opaque light shield means mounted between said light source and said rear vertical corner and blocking direct view of the light source from the front of the aquarium, said light source being located to illuminate a side portion of the vessel forwardly of the shield means and provide at least one vertical light beam which can be refracted and dispersed horizontally through the vessel and emerge through said front vertical wall.

2. The illuminated aquarium tank of claim 1, and wherein said transparent vessel is of polygonal horizontal cross-section.

3. The illuminated aquarium tank of claim 2, and wherein said polygonal horizontal cross-section has at least one front corner subtending an acute angle.

4. The illuminated aquarium tank of claim 3, and wherein said shield means comprises a vertical strip of opaque material disposed between said rear corner and the linear vertical light source.

5. The illuminated aquarium tank of claim 4, and wherein said vertical light source is located closely adjacent to the intermediate portion of said vertical strip of opaque material.

6. The illuminated aquarium tank of claim 5, and wherein said light source comprises an elongated vertical lamp bulb and said strip is provided with a lamp socket in which said lamp bulb is mounted.

7. The illuminated aquarium tank of claim 6, and wherein an opaque housing is mounted over said lamp bulb, said housing being formed with a longitudinal slit located on a radius directed forwardly and toward the adjacent side wall surface of the transparent vessel.

8. The illuminated aquarium tank of claim 7, and wherein said front corner subtending said acute angle is located at the same side of said transparent vessel as said side wall surface.

9. The illuminated aquarium tank of claim 2, and wherein said transparent vessel has two front corners, each subtending an acute angle, and wherein two substantially linear light source are provided, spaced on opposite sides of the apex of said rear vertical corner, said light shield means comprising a vertical strip of opaque sheet material of V-shaped cross-section interposed between said light sources and said rear vertical corner and blocking direct view of the light sources from the front of the vessel.

10. The illuminated aquarium tank of claim 9, and wherein respective lamp sockets are secured to the V-shaped vertical strips on opposite sides of the apex thereof, and said light sources comprise vertical elongated lamp bulbs mounted in said lamp sockets and extending closely adjacent to the midportions of respective sides of the V-shaped strip.

11. The illuminated aquarium tank of claim 10, and wherein said lamp bulbs are provided with opaque housings formed with longitudinal slits located on radial lines directed toward the intermediate portions of the adjacent side walls of the transparent vessel.

* * * * *